United States Patent
Berner et al.

(10) Patent No.: US 12,058,459 B2
(45) Date of Patent: Aug. 6, 2024

(54) NMOS COMPARATOR FOR IMAGE SENSOR PIXEL

(71) Applicant: SONY ADVANCED VISUAL SENSING AG, Schlieren (CH)

(72) Inventors: Raphael Berner, Confignon (CH); Chistian Brändli, Baden (CH)

(73) Assignee: SONY ADVANCED VISUAL SENSING AG, Schlieren (CH)

( * ) Notice: Subject to any disclaimer, the term of this patent is extended or adjusted under 35 U.S.C. 154(b) by 32 days.

(21) Appl. No.: 17/609,438

(22) PCT Filed: May 8, 2020

(86) PCT No.: PCT/IB2020/054397
§ 371 (c)(1),
(2) Date: Nov. 8, 2021

(87) PCT Pub. No.: WO2020/229979
PCT Pub. Date: Nov. 19, 2020

(65) Prior Publication Data
US 2022/0224853 A1 Jul. 14, 2022

Related U.S. Application Data

(60) Provisional application No. 62/846,282, filed on May 10, 2019.

(51) Int. Cl.
*H04N 25/75* (2023.01)
*H04N 25/71* (2023.01)
(Continued)

(52) U.S. Cl.
CPC ........... *H04N 25/75* (2023.01); *H04N 25/745* (2023.01); *H04N 25/771* (2023.01); *H04N 25/79* (2023.01)

(58) Field of Classification Search
CPC .... H04N 25/75; H04N 25/745; H04N 25/771; H04N 25/79; H04N 25/772
See application file for complete search history.

(56) References Cited

U.S. PATENT DOCUMENTS 7,728,269 B2 6/2010 Lichtsteiner et al.
2006/0232676 A1* 10/2006 Boemler ............... H04N 25/75
348/E5.079
(Continued)

FOREIGN PATENT DOCUMENTS

EP 0 549 354 A2 6/1993
EP 3 435 658 A1 1/2019
(Continued)

OTHER PUBLICATIONS

Yu M. Chi et al., "CMOS Camera With In-Pixel Temporal Change Detection and ADC", IEEE Journal of Solid-State Circuits, 42(10), 2187-2196, Oct. 2007.*
(Continued)

*Primary Examiner* — Nhan T Tran
(74) *Attorney, Agent, or Firm* — HoustonHogle LLP

(57) ABSTRACT

An NMOS-only operational transconductance amplifier (OTA) replaces the PMOS transistors with switched capacitor pseudo-resistors in the pixels of an optical sensor such as a dynamic vision sensor or event-based vision sensor. Thus, if a stacked CMOS image sensor (CIS) process is employed, then the upper wafer can be kept free from N-wells, while still having the complete OTA on the upper wafer. Thus, it is possible to have only one wafer-to-wafer connection per pixel. Moreover, by operating the switched capacitor pseudo-resistors as three terminal devices, the gain can further be increased.

12 Claims, 5 Drawing Sheets

(51) Int. Cl.
*H04N 25/771* (2023.01)
*H04N 25/79* (2023.01)

(56) References Cited

U.S. PATENT DOCUMENTS

| | | | |
|---|---|---|---|
| 2008/0135731 A1 | 6/2008 | Lichtsteiner et al. | |
| 2018/0191972 A1 | 7/2018 | Berner et al. | |
| 2019/0081093 A1* | 3/2019 | Matsumoto | H04N 25/772 |

FOREIGN PATENT DOCUMENTS

| | | |
|---|---|---|
| JP | 2001346102 A | 12/2001 |
| KR | 20120111730 A | 10/2012 |
| WO | WO 2018/122798 | 7/2018 |

OTHER PUBLICATIONS

International Preliminary Report on Patentability, mailed on Nov. 25, 2021, from International Application No. PCT/IB2020/054397, filed on May 8, 2020. 13 pages.

International Search Report and Written Opinion of the International Searching Authority, mailed on Jun. 26, 2020, from International Application No. PCT/IB2020/054397, filed on May 8, 2020. 21 pages.

Chi, Y.M., et al., "CMOS Camera with In-Pixel Temporal Change Detection and ADC," IEEE Journal of Solid-State Circuits, 42(10): 2187-2196 (2007).

Jang, T., et al., "Circuit and System Designs of Ultra-Low Power Sensor Nodes with Illustration in a Miniatured GNSS Logger for Position Tracking: Part I—Analog Circuit Techniques," IEEE Transactions on Circuit and Systems-1 Regular Papers, 64(9): 2237-2249 (2017).

Itoh, Y., et al., "4-Layer 3-DIC with a Function of Parallel Signal Processing," Microelectronic Engineering, 15: 187-190 (1991).

Vilella E., et al., "Prototyping of an HV-CMOS demonstrator for the High Luminosity-LIIC upgrade," Journal of Instrumentation, Institute of Physics Publishing, vol. 11(1), Jan. 12, 2016, 9 Pages.

Chen, D.G., et al., "Pulse-Modulation Imaging-Review and Performance Analysis," IEEE Transactions on Circuit and Systems, vol. 5(1), Feb. 1, 2011, pp. 64-82.

* cited by examiner

NMOS COMPARATOR FOR IMAGE SENSOR PIXEL

RELATED APPLICATIONS

This application is a § 371 National Phase Application of International Application No. PCT/IB2020/054397, filed on May 8, 2020, now International Publication No. WO 2020/229979 A1, published on Nov. 19, 2020, which International Application claims the benefit under 35 USC 119(e) of U.S. Provisional Application No. 62/846,282, filed on May 10, 2019, both of which are incorporated herein by reference in their entirety.

BACKGROUND OF THE INVENTION

Today, machine vision is mostly based on conventional cameras and their associated frame-based, spatially resolved optical sensors. For some machine vision tasks, e.g., object recognition, these conventional frame-based cameras, with their image-based optical sensors, are well suited. However, for other tasks, e.g., monitoring, tracking or position and motion estimation, the conventional image sensors have drawbacks.

The main drawback is that conventional cameras produce a significant amount of redundant and unnecessary data, which has to be captured, communicated and processed. This high data load slows down the reaction time by decreasing temporal resolution, results in increased power consumption, and increases the size and cost of machine vision systems. In addition, most image sensors suffer from limited dynamic range, poor low-light performance and motion blur.

On the other hand, so-called Dynamic Vision Sensors (DVS) overcome the limitations of frame-based encoding. See U.S. Patent Application Publication No. US 2008/0135731, by Lichtsteiner et al., entitled "Photoarray for Detecting Time-Dependent Image Data", which is incorporated herein by this reference. These spatially-resolved optical sensors use in-pixel data compression to remove data redundancy. They can also achieve high temporal resolution, low latency, low power consumption, high dynamic range with little motion blur. The DVS-type of optical sensor is thus well suited, especially for solar or battery powered compressive sensing or for mobile machine vision applications where the position of the system has to be estimated and where processing power is limited due to limited battery capacity.

The DVS pre-processes visual information locally. Instead of generating crisp images, the DVS produces smart data for computer applications. While conventional image sensors capture a movie as a series of still images, the DVS detects and only transmits the position of changes in a scene. It encodes the visual information much more efficiently than conventional cameras because it does in-pixel data compression. This means that processing of data is possible using less resources, lower net power and with faster system reaction time. The high temporal resolution allows continuously tracking visual features and thereby overcoming the correspondence problem. Additionally, the architecture of DVS allows for high dynamic range and good low-light performance.

Event-based vision sensors (EVBS) are often but not always variants of the original DVS architectures. As a general rule, the pixels of EVBS's operate asynchronously without a periodic sampling rate and emit a so-called DVS address event as soon as they perceive a luminance change exceeding an adjustable threshold. ON events are associated with an increase in luminance exceeding the threshold; and OFF events ON events are associated with a decrease in luminance exceeding the threshold at a given pixel.

In addition, there are many examples of hybrid spatially-resolved optical sensors. For example, it has been proposed to combine frame-based image sensing with event-based vision sensing into the same array of pixels. Moreover, there are other proposed sensor architectures that provide different combinations of event detection and image sensing.

SUMMARY OF THE INVENTION

Typically, vision sensors capture temporal change events through a combination of four elements all of which can have certain shortcomings in many of the proposed architectures.

Current-domain logarithmic (log) photoreceptors are continuous time circuits. They typically have additional shot noise source from a feedback transistor. They also suffer from reduce signal to noise ratio (SNR) in low-light conditions compared to conventional image sensors. They also tend to be slow in low lighting conditions.

The analog memories of these sensors also present design challenges. They suffer from leakage and can consume a relatively large surface area on the sensor die. Moreover, the nature of the memories means that the integrated signal is lost during pixel reset. The magnitude of the event is lost, i.e. amount of change that triggered the event, is unknown.

The in-pixel comparators of the sensors sometimes pose problems. They are complex with many transistors. This impacts the sensors' fill factors.

The characteristic asynchronous readout of the sensors is also problematic. It tends to necessitate complex circuits that require extras transistors.

At the same time, stacked CMOS image sensor (CIS) processes allow small feature sizes on the bottom wafer while having highly light sensitive upper wafer. This cannot really be leveraged by DVS-type architectures, however. The capacitance of metal-insulator-metal (MiM) capacitors common to CMOS processes does not scale with feature size. They thus tend to dominate die area as other circuits shrink. Also, many transistors cannot be scaled to the CMOS process' minimal feature size since matching is important. Moreover, many transistors have to be designed to operate with high supply voltages and thus thick gate oxide layers to withstand sufficiently large voltage swings or exhibit sufficiently small gate/channel leakages. Also, new CIS processes use highly optimized photoreceptors with full charge transfer to reduce noise, but DVS architectures cannot take advantage of these process advancements because the photodiode is operated in continuous-time.

The present invention can be employed to address some of these challenges. It can leverage a stacked optical sensor with a photoreceptor wafer that can "write" its value into a lower digital, analog or hybrid digital-analog lower wafer, in which memory and/or processing is performed.

This "writing" operation is best performed using an operational transconductance amplifier (OTA) since this can allow, for example, a double sampling scheme, i.e., using the same OTA for resetting the photoreceptor and detecting changes.

The main challenge with OTAs is that they usually need PMOS transistors. The N-well required for the PMOS acts as a photodiode and therefore reduces the quantum efficiency and introduces noise in the circuits. The concomitate N-well spacing rules will then increase the pixel area.

The proposed solution can concern an NMOS-only operational transconductance amplifier. It replaces the PMOS transistors with switched capacitor pseudo-resistors. Thus, the upper wafer can be kept free from N-wells, while still having the complete OTA on the upper wafer. Thus, it is possible to have only one wafer-to-wafer connection per pixel, if a stacked CIS process is employed. Moreover, by operating the switched capacitor pseudo-resistors as three terminal devices, the gain can further be increased.

In general, according to one aspect, the invention features a comparator for an optical sensor, comprising input NMOS transistors receiving respective comparator inputs and clocked NMOS transistors controlling a drain resistance of at least one of the input NMOS transistors.

Embodiments include a capacitor coupled to a node between the clocked NMOS transistors. Further some have clocked NMOS transistors controlling a drain resistance of each of two input NMOS transistors. In fact some have two pairs of clocked NMOS transistors, each of the pairs controlling a drain resistance to each of two input NMOS transistors. In this later case, a capacitor can coupled between each pair of the clocked NMOS transistors.

In addition, a further pair of clocked NMOS transistors can be used for controlling a source resistance of the input NMOS transistors.

In general, according to another aspect, the invention features a pixel circuit for an optical sensor comprising a photoreceptor for detecting received photons and a comparator for comparing an output of the photoreceptor to reference voltage, wherein the comparator contains no PMOS transistors.

In general, according to another aspect, the invention features a pixel circuit for an optical sensor comprising a photoreceptor for detecting received photons and a comparator for comparing an output of the photoreceptor to reference voltage, and employing switched capacitor pseudo resistors for source and/or drain resistances for input transistors.

In general, according to still another aspect, the invention features an optical sensor comprising an array of pixel circuits, wherein each of the pixel circuits comprises a photoreceptor for detecting photons and a comparator for comparing an output of the photoreceptor to reference voltage, and employing switched capacitor pseudo resistors for source and/or drain resistances for input transistors.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
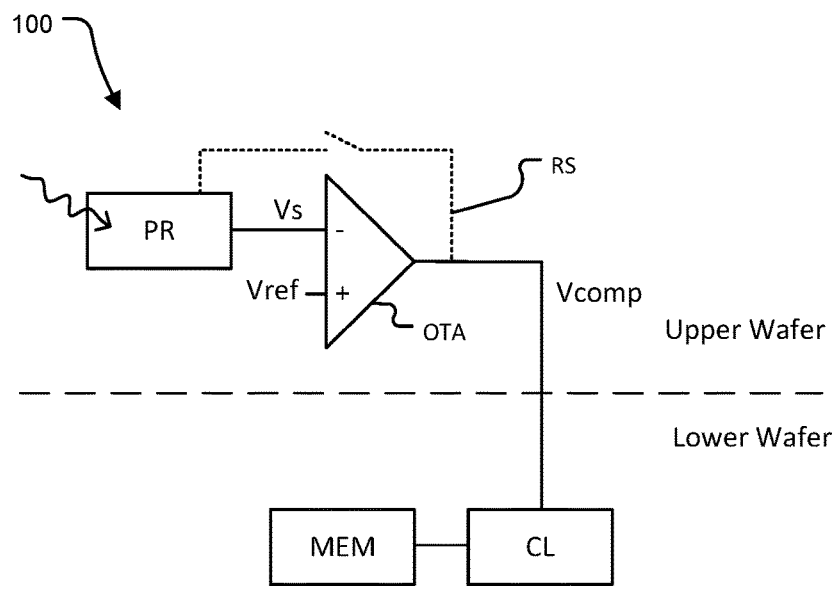
FIG. 1A is a circuit diagram showing a pixel for optical sensor using stacked CMOS dies according to the present invention.

FIG. 1A shows a generalized a pixel circuit 100 for a dynamic vision or event-based vision sensor, or other optical sensor, that is implemented across stacked complimentary metal oxide semiconductor (CMOS) dies according to the principles of the present invention.

In an upper wafer, a photoreceptor (PR) converts photons into a sensor voltage Vs. Sometimes a reset path RS is provided to reset this voltage upon detecting an event or at startup or sensor reset, for example.

The operational transconductance amplifier (OTA) may be used in two ways to sense the PR value manifest in the sensor voltage Vs.

In a direct readout mode, a ramp-ADC or similar scheme is used such that a reference voltage Vref is changed over time by a controller. The OTA is used as a comparator to determine the PR value and store it in the lower wafer. This will yield image-sensor like functionality for the pixel.

In a double sampled readout, the OTA is used to reset the PR via path RS. The OTA is then used for a direct readout.

In the lower wafer, control logic (CL) ensures the conversion and storage of the PR value in the digital or analog memory (MEM).

Figure 1B:
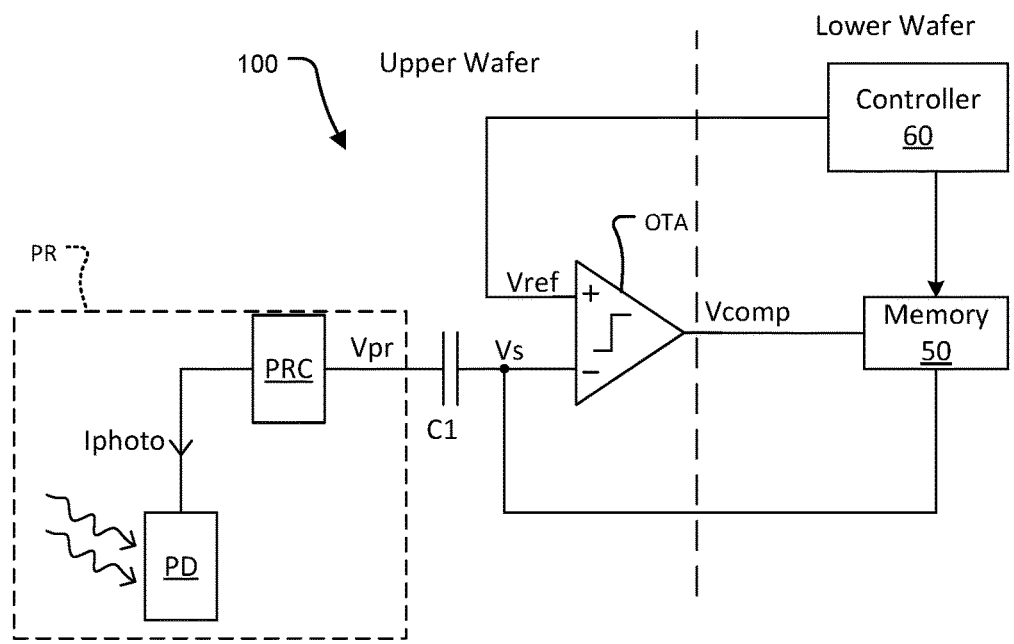
FIG. 1B is a circuit diagram showing a more specific design for a pixel for an event-based vision sensor using stacked CMOS dies to which the invention could be applied.

FIG. 1B shows details of a pixel architecture for an event-based vision sensor extending across CMOS dies also according to the principles of the present invention.

The basic circuit arrangement is taken from PCT/IB2017/058526 and U.S. Pub. No. 2018/0191972, which is incorporated herein by this reference in its entirety. However, the core concepts in the proposed invention can be applied to virtually any Event-Based Vision Sensor realized as IC, not depending on any specific pixel architecture used.

The pixel circuit 100 contains a photodiode PD, or other photosensor, to measure impinging light and convert the light intensity to current Iphoto. A photoreceptor circuit PRC then generates a photoreceptor signal Vpr dependent on the light intensity. A memory capacitor C1 remembers a past photoreceptor signal. The photosensor PD, photoreceptor circuit PRC, and memory capacitor C1 constitute the photoreceptor module PR.

The memory capacitor C1 receives the photoreceptor signal Vpr such that first plate of the capacitor carries a charge that is responsive to the photoreceptor signal Vpr and thus the light received by the photosensor PD. A second plate of the memory capacitor C1 is connected to the comparator node (inverting input) of the OTA. Thus the voltage of the comparator node, Vs, varies with changes in the photoreceptor signal Vpr.

An OTA compares the difference between current photoreceptor signal Vpr and past photoreceptor signal to a threshold manifest in the reference voltage Vref.

The pixel circuit is preferably implemented in stacked dies, in which the photoreceptor PR and the operational transconductance amplifier comparator OTA are in an upper die that is optimized for sensitivity to the incoming photons.

On the other hand, a memory 50, of a lower die, stores the OTA output Vcomp based on a sample signal from the controller 60. Memory can be a sampling circuit (for example a switch and a parasitic or explicit capacitor) or a digital memory circuit (a latch or a flip-flop). In one embodiment, the memory will be a sampling circuit and each pixel will have two memories.

Peripheral circuits control the pixel circuits 100 of the entire array of the spatially resolved optical sensor. Typically, the array will contain a two dimensional array of the pixel circuits, such as an array of greater than 100 by 100 pixels. Moreover, the peripheral circuits will often contain a controller 60 which applies threshold signals to the OTAs and sends control signals to memories 50.

The peripheral circuits may also contain a readout circuit for the array, which reads the content of the memories 50, determines if the light intensity for each pixel has increased, decreased, or is unchanged, and sends the output (computed from the current memory value) to a processor.

In more detail, the OTA of each pixel discriminates whether the light received by that pixel has increased and/or decreased. For an OFF event: if Vs is lower than the threshold Voff (on Vref), the OTA output is high, and this level is stored in the memory. This means a decrease is detected. If Vs is not lower than the threshold, the comparator output is low: no decrease detected.

For an ON event, a low comparator output means an increase, while high means no change. So the readout must know the memory content and which threshold was applied.

The pixel circuits 100 and controller 60 operate as follows.

A change in light intensity received by the photosensor PD will translate to a change in photoreceptor signal Vpr. The changes in Vpr will be reflected also in the voltage Vs at a comparator node at the inverting input (−) to the OTA. This occurs because the voltage across the memory capacitor C1 stays constant.

At times selected by the controller 60, the OTA compares the voltage at the comparator node at the second terminal of the memory capacitor C1 (Vs) to a threshold voltage Vref (from controller 60) applied to the non-inverting input (+) of the OTA.

The controller 60 operates the memory 50 to store the comparator output Vcomp.

As mentioned previously, a problem arises when implementing the OTA for each pixel circuit of an optical sensor's two dimension array of pixels. The OTA will usually need PMOS transistors. The N-well required for the PMOS acts as a photodiode, however. This reduces the quantum efficiency and introduces noise in the circuits.

The proposed solution can concern an NMOS-only operational transconductance amplifier. It replaces the PMOS transistors with switched capacitor pseudo-resistors. Thus, the upper wafer can be kept free from N-wells, while still having the complete OTA on the upper wafer. Thus, it is possible to have only one wafer-to-wafer connection per pixel. Moreover, by operating the switched cap pseudo-resistors as three terminal devices, the gain can further be increased.

Figure 2A:
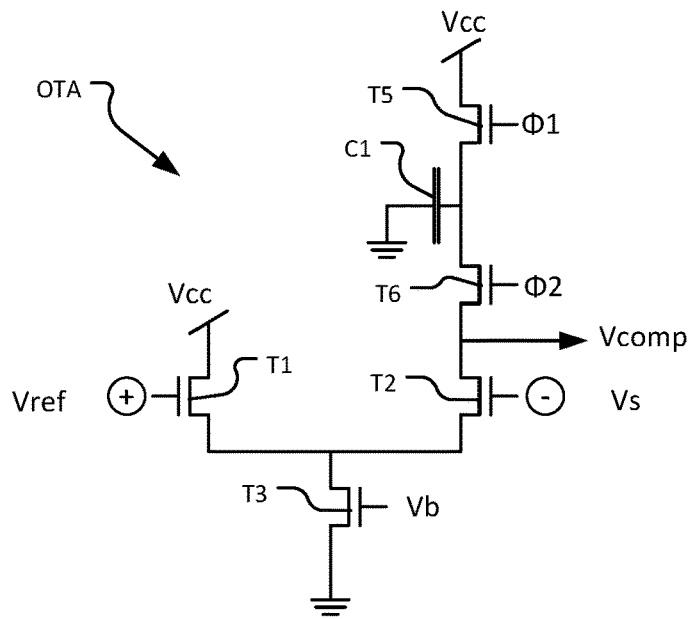
FIG. 2A is a circuit diagram of a first embodiment of an OTA for the pixel circuit 100 of pixel array of an optical sensor.

FIG. 2A shows a first embodiment of an OTA for the pixel circuit 100 of pixel array of an optical sensor.

The basic circuit includes a first input transistor T1 that receives Vref at its gate. Its drain is connected to the voltage source rail. A second input transistor T2 receives Vs at its gate. The sources of the first transistor T1 and the second transistor T2 are connected to the drain of a third bias transistor T3 that receives a bias voltage at its gate, with its source being connected to ground.

The OTA has a continuous time current source, and uses switched-capacitor pseudo resistors to convert current to voltage. Each pseudo-resistor includes a capacitor C1 and two switches, clocked transistor T5 and clocked transistor T6, which are driven by two clock sources phi1 and phi2, received at their respective gates. Phi1 and phi2 are non-overlapping clocks. Clocked transistor T5 and transistor T6 are connected between the voltage source Vcc and the drain of input transistor T2.

The output of the OTA is taken at the drain of transistor T2, and the according output capacitance.

It may be advantageous to drive phi1 and phi2 with higher voltages than the supply voltage Vcc of the OTA to ensure that all switches are properly turned on.

Figure 2B:
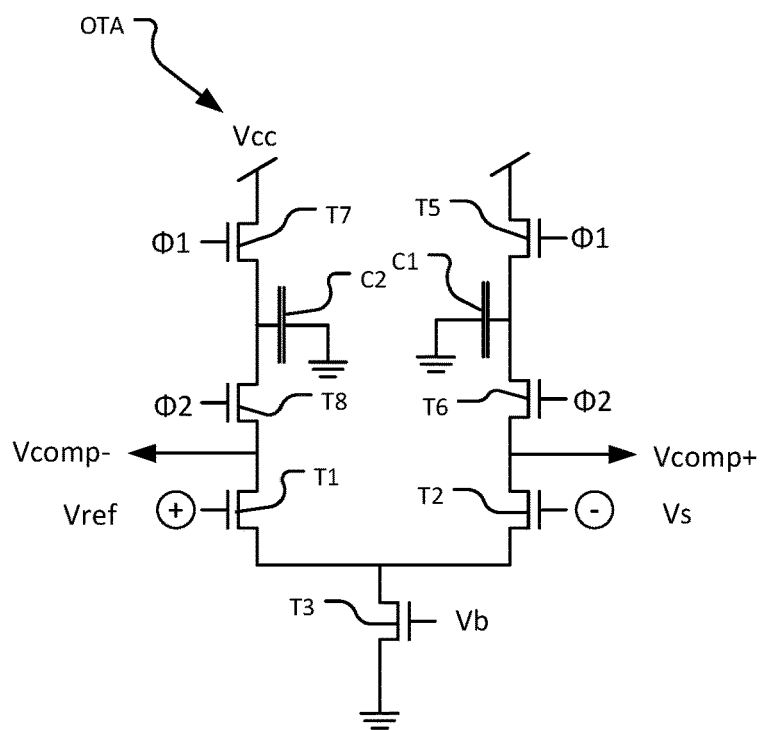
FIG. 2B is a circuit diagram of a second embodiment of an OTA for the pixel circuit 100 of pixel array of an optical sensor.

FIG. 2B shows a second embodiment of an OTA for the pixel circuit 100 of pixel array of an optical sensor.

This version also uses switched-capacitor pseudo resistors including a capacitor C2 and two switches, clocked transistor T7 and clocked transistor T8, which are driven by the two clocks between the voltage source Vcc and the drain of transistor T1. This embodiment may be used with differential outputs Vcomp+ and Vcomp−.

Figure 2C:
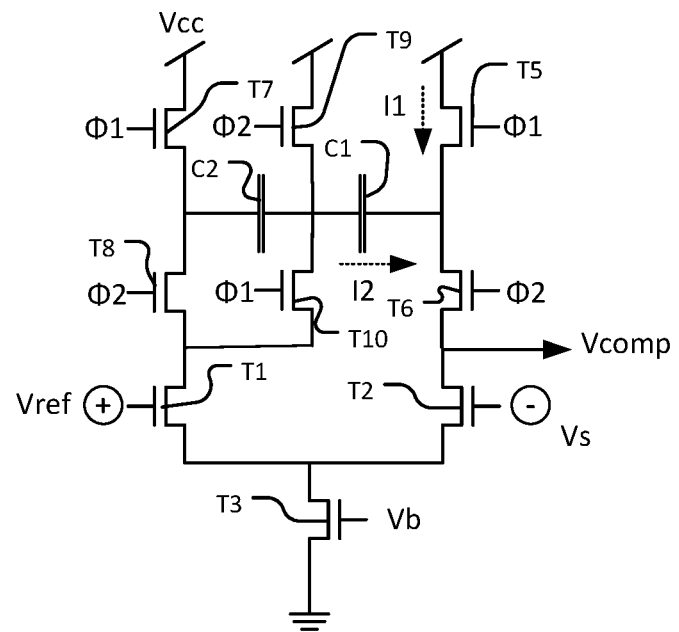
FIG. 2C is a circuit diagram of a third embodiment of an OTA for the pixel circuit 100 of pixel array of an optical sensor.

FIG. 2C shows a third embodiment of an OTA for the pixel circuit 100 of pixel array of an optical sensor.

This version includes transistors T9 and T10 connected between the previously grounded terminals of capacitors C1 and C2. Further, the source of transistor T10 is connected to the drain of transistor T1.

Here, the third terminal of the switched cap pseudo-resistors allows to further increase the gain of the circuit by injecting a current which is proportional to the voltage in the opposite "leg".

In addition to the resistor current (I1), which is inversely proportional to the output voltage, a third terminal current (I2) inversely proportional to the voltage on the other leg is injected.

Figure 2D:
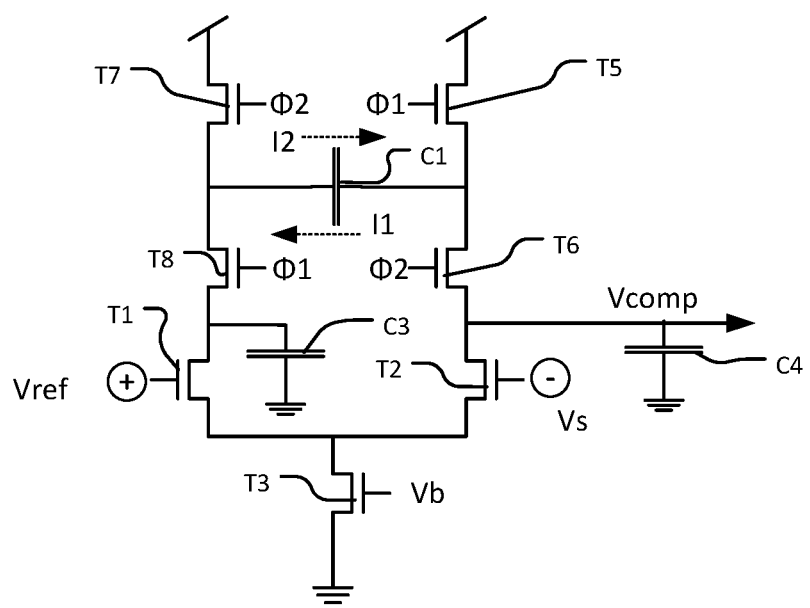
FIG. 2D is a circuit diagram of a fourth embodiment of an OTA for the pixel circuit 100 of pixel array of an optical sensor.

FIG. 2D shows a fourth embodiment of an OTA for the pixel circuit 100 of pixel array of an optical sensor.

If the phases of the switched cap clocks phi1 and phi2 across a shared capacitor C1 are inverted, the current I1, I2 injected into each leg is inversely proportional to the other leg's voltage which results in a feedback effect and therefore increased gain.

In this embodiment, along with the previous embodiments, the load of the output Vcomp has to be carefully considered and balanced accordingly with respect to parasitic capacitances C3 and C4.

Figures 3, 4:
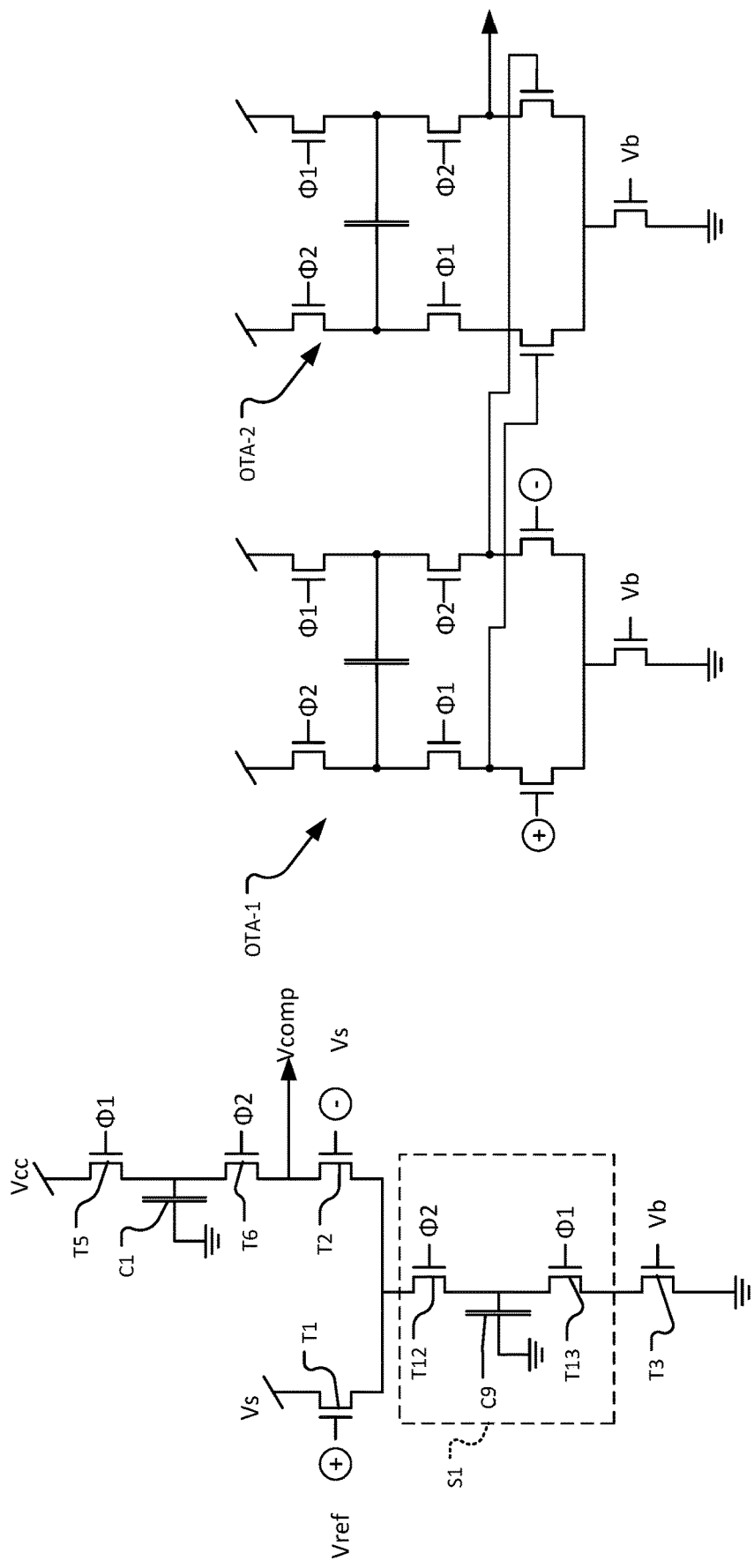
FIG. 3 is a circuit diagram showing a modification employing a switched-capacitor current source S1 instead of a continuous time current source.
FIG. 4 is a circuit diagram showing multi-stage OTA.

FIG. 3 shows a modification to the OTA for the pixel circuit 100.

For stable output, it is advantageous to use a switched-capacitor current source S1 instead of a continuous time current source.

Specifically, a switched-capacitor pseudo resistor comprising a capacitor C9 and two switches, transistor T12 and transistor T13, which are driven by the two clock sources phi1 and phi2, are added between the coupled drains of transistors T1, T2 and the source of transistor T3.

Moreover, this same modification can be made to each of the embodiments shown in FIGS. 2B, 2C, and 2D.

As shown in FIG. 4, multi-stage versions are possible by connecting the outputs of the first stage OTA-1 to the inputs of a second stage OTA-2.

Figure 5A:
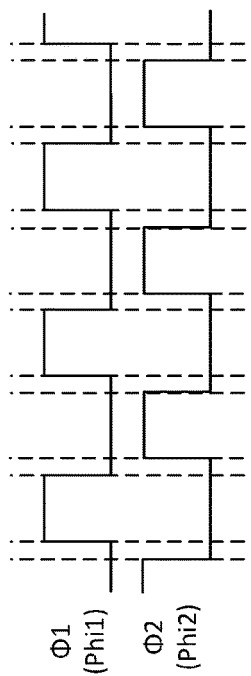
FIG. 5A is a plot of the voltage of the clocks phi1 and phi2 as a function of time.

FIG. 5A. illustrates the concept of non-overlapping clocks phi1 and phi2. The clocks' transitions occur at different times and the clocks are not simultaneously at a high logic level.

Figure 5B:
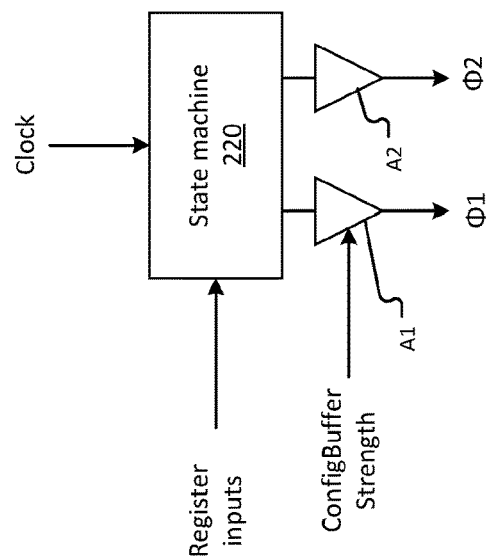
FIG. 5B is a block diagram showing an arrangement for generating the clocks phi1 and phi2.

FIG. 5B shows one approach for how the optical sensor might generate the two clock sources phi1 and phi2.

Here, a clock used by the sensor is received by a state machine 220 that is configured by the controller 60 of the image sensor. The state machine 220 produces the two clock signals phi1 and phi2 through two buffer amplifiers A1, A2. A configuration buffer can be used to control the gain of this amplification stage.

Figure 6:
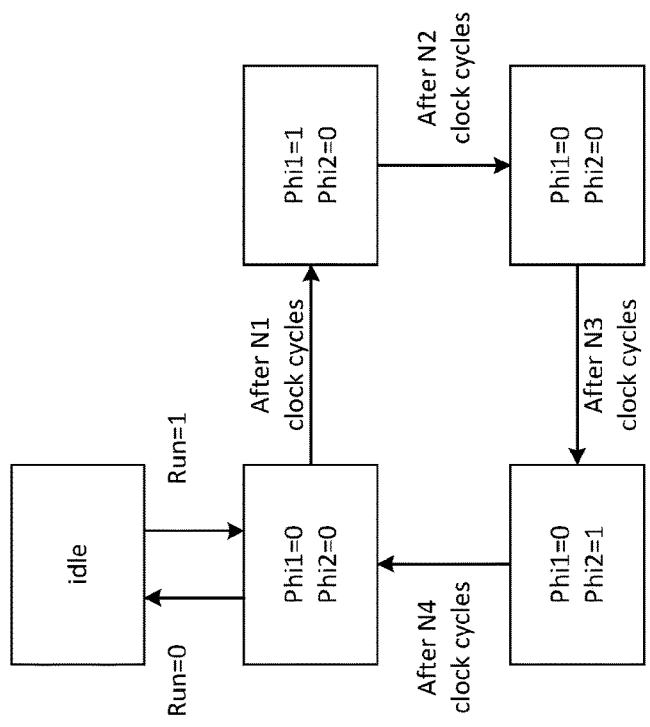
FIG. 6 shows an implementation of the state machine 220 of block diagram FIG. 5A.

FIG. 6 shows the state diagram of the state machine 220 of FIG. 5B. The state machine has one state for idle-mode where the circuit is not operating. If the circuit is enabled, the state machine cycles through four different states. In the first state, both output phi1 and phi2 are zero. After a configurable number of clock cycles N1, the state machine goes to the second state, in which the output phi1 is 1, while the output phi2 is still zero. It stays in the state for a configurable number of clock cycles N2, and then goes into the third state. In the third state, both outputs are again zero. After a configurable number of clock cycles N3, the state machine goes to the fourth state. In this state the output phi2 is 1, while the output phi1 is zero. After a configurable number of clock cycles N4, the state machine goes back to the first state and the cycle restarts.

While this invention has been particularly shown and described with references to preferred embodiments thereof, it will be understood by those skilled in the art that various changes in form and details may be made therein without departing from the scope of the invention encompassed by the appended claims.

What is claimed is:

1. A comparator for an optical sensor, comprising:
input NMOS transistors at an inverting input and a non-inverting input of the comparator, the input NMOS transistors receiving respective comparator inputs at respective gates of the input NMOS transistors, wherein one of the gates receives a voltage from a first plate of a memory capacitor, a second plate of the memory capacitor receives a photoreceptor signal; and
clocked NMOS transistors controlling a drain resistance of at least one of the input NMOS transistors.

2. The comparator of claim 1, further comprising a capacitor coupled to a node between the clocked NMOS transistors.

3. The comparator of claim 1, further comprising clocked NMOS transistors controlling a drain resistance of each of two input NMOS transistors.

4. The comparator of claim 1, further comprising two pairs of clocked NMOS transistors, each of the pairs controlling a drain resistance to each of two input NMOS transistors.

5. The comparator of claim 4, further comprising a capacitor coupled between each pair of the clocked NMOS transistors.

6. The comparator of claim 1, further comprising a further pair of clocked NMOS transistors controlling a source resistance of the input NMOS transistors.

7. A comparator of claim 1, further comprising a capacitor coupled to a node between the clocked NMOS transistors.

8. A pixel circuit for an optical sensor, comprising:
a photoreceptor for detecting received photons; and
a comparator for comparing an output of the photoreceptor to reference voltage, and employing switched capacitor pseudo resistors for source and/or drain resistances for input transistors, which receive respective comparator inputs at respective gates of the input transistors, wherein one of the gates receives a voltage from a first plate of a memory capacitor and a second plate of the memory capacitor receives a photoreceptor signal from the photoreceptor.

9. The circuit of claim 8, further comprising a memory for storing an output of the comparator.

10. The circuit of claim 8, further comprising a memory for a digital number that corresponds to the time when the comparator output changes from one state to a second state.

11. The circuit of claim 8, wherein the pixel circuit is implemented in stacked dies, in which the photoreceptor and the comparator are in an upper die and the memory is in a lower die.

12. An optical sensor comprising an array of pixel circuits, wherein each of the pixel circuits comprises:
   a photoreceptor for detecting photons; and
   a comparator for comparing an output of the photoreceptor to reference voltage, and employing switched capacitor pseudo resistors for source and/or drain resistances for input transistors, which receive respective comparator inputs at respective gates of the input transistors, wherein one of the gates receives a voltage from a first plate of a memory capacitor and a second plate of the memory capacitor receives a photoreceptor signal from the photoreceptor.

* * * * *